United States Patent
Mitra et al.

(10) Patent No.: US 11,217,228 B2
(45) Date of Patent: Jan. 4, 2022

(54) SYSTEMS AND METHODS FOR SPEECH RECOGNITION IN UNSEEN AND NOISY CHANNEL CONDITIONS

(71) Applicant: SRI International, Menlo Park, CA (US)

(72) Inventors: Vikramjit Mitra, Fremont, CA (US); Horacio E. Franco, Lebanon, NJ (US); Chris D. Bartels, Monterey, CA (US); Dimitra Vergyri, Sunnyvale, CA (US); Julien van Hout, San Francisco, CA (US); Martin Graciarena, Belmont, CA (US)

(73) Assignee: SRI International, Menlo Park, CA (US)

( * ) Notice: Subject to any disclaimer, the term of this patent is extended or adjusted under 35 U.S.C. 154(b) by 288 days.

(21) Appl. No.: 16/085,262

(22) PCT Filed: Mar. 22, 2017

(86) PCT No.: PCT/US2017/023638
§ 371 (c)(1),
(2) Date: Sep. 14, 2018

(87) PCT Pub. No.: WO2017/165551
PCT Pub. Date: Sep. 28, 2017

(65) Prior Publication Data
US 2020/0168208 A1    May 28, 2020

Related U.S. Application Data

(60) Provisional application No. 62/311,717, filed on Mar. 22, 2016.

(51) Int. Cl.
*G10L 15/07*     (2013.01)
*G10L 15/02*     (2006.01)
(Continued)

(52) U.S. Cl.
CPC ............ *G10L 15/075* (2013.01); *G10L 15/02* (2013.01); *G10L 15/04* (2013.01); *G10L 15/16* (2013.01); *G10L 15/22* (2013.01); *G10L 25/24* (2013.01)

(58) Field of Classification Search
CPC ....... G10L 15/063; G10L 15/07; G10L 15/16; G10L 13/075; G10L 15/075
(Continued)

(56) References Cited

U.S. PATENT DOCUMENTS 8,103,646 B2 * 1/2012 Brown .................... G06F 16/78
                                                         707/705
9,373,324 B2 * 6/2016 Sainath ................... G10L 15/07
(Continued)

FOREIGN PATENT DOCUMENTS

| JP | H-1185184 A | 3/1999 |
| JP | 2015102806 A | 6/2015 |
| WO | WO2017/165551 A1 | 9/2017 |

OTHER PUBLICATIONS

Richardson et al., "Deep Neural Network Approaches to Speaker and Language Recognition", IEEE Signal Processing Letters, vol. 22, No. 10, dated Oct. 2015, Part 1 Introduciton, 5 pages.
(Continued)

*Primary Examiner* — Susan I McFadden
(74) *Attorney, Agent, or Firm* — Moser Taboada

(57) ABSTRACT

Systems and methods for speech recognition are provided. In some aspects, the method comprises receiving, using an input, an audio signal. The method further comprises splitting the audio signal into auditory test segments. The method further comprises extracting, from each of the auditory test segments, a set of acoustic features. The method further comprises applying the set of acoustic features to a deep neural network to produce a hypothesis for the corresponding auditory test segment. The method further comprises
(Continued)

selectively performing one or more of: indirect adaptation of the deep neural network and direct adaptation of the deep neural network.

20 Claims, 10 Drawing Sheets

(51) Int. Cl.
*G10L 15/04* (2013.01)
*G10L 15/16* (2006.01)
*G10L 15/22* (2006.01)
*G10L 25/24* (2013.01)

(58) Field of Classification Search
USPC .......................................................... 704/232
See application file for complete search history.

(56) References Cited

U.S. PATENT DOCUMENTS

| | | | |
|---|---|---|---|
| 9,524,730 B2 * | 12/2016 | Wang | G10L 25/30 |
| 10,204,621 B2 * | 2/2019 | Cui | G10L 15/07 |
| 10,373,612 B2 * | 8/2019 | Parthasarathi | G10L 15/16 |
| 10,388,272 B1 * | 8/2019 | Thomson | G10L 15/063 |
| 10,552,730 B2 * | 2/2020 | Yumer | G06N 3/0454 |
| 10,559,225 B1 * | 2/2020 | Tao | G10L 15/16 |
| 10,573,312 B1 * | 2/2020 | Thomson | G10L 15/30 |
| 2015/0066499 A1 | 3/2015 | Wang et al. | |
| 2015/0161995 A1 | 6/2015 | Sainath et al. | |
| 2015/0255062 A1 | 9/2015 | Penn et al. | |

OTHER PUBLICATIONS

International Searching Authority, "Written Opinion", in application No. PCT/US2017/023638, dated Jun. 8, 2017, 20 pages.

* cited by examiner

SYSTEMS AND METHODS FOR SPEECH RECOGNITION IN UNSEEN AND NOISY CHANNEL CONDITIONS

CROSS-REFERENCE TO RELATED APPLICATIONS

This application is a U.S. National Stage Patent Application filed under 35 U.S.C. § 371 of International Patent Application No. PCT/US17/23638 filed Mar. 22, 2017, which claims priority to U.S. Provisional Application Ser. No. 62/311,717, filed Mar. 22, 2016, the entire contents of all of which are hereby incorporated by reference as if fully set forth herein for all purposes.

STATEMENT REGARDING FEDERALLY SPONSORED RESEARCH

This invention was made with government support under Contract No. HR0011-15-C-0037 supported by the Defense Advanced Research Projects Agency (DARPA). The government has certain rights in this invention.

BACKGROUND

The present disclosure relates, generally, to systems and methods for processing audio data for speech recognition. More particularly, the present disclosure relates to improved systems and methods for speech recognition in unseen and noisy channel conditions.

Speech recognition in varying background conditions is a challenging problem. Acoustic condition mismatch between training and evaluation data can significantly reduce recognition performance. For mismatched conditions, data-adaptation techniques are typically found to be useful, as they expose the acoustic model to the new data condition(s). Supervised adaptation techniques usually provide substantial performance improvement, but such gain is contingent on having labeled or transcribed data, which is often unavailable. The alternative is unsupervised adaptation, where feature-transform methods and model-adaptation techniques are typically explored.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

The foregoing and other aspects and advantages of the invention will appear from the following description. In the description, reference is made to the accompanying drawings that form a part hereof, and in which there is shown by way of illustration preferred embodiments of the invention. Such embodiments do not necessarily represent the full scope of the invention, however, and reference is made therefore to the claims and herein for interpreting the scope of the invention.

DETAILED DESCRIPTION

This present application investigates robust features, feature-space maximum likelihood linear regression (fMLLR) transform, and deep convolutional networks to address the problem of unseen channel and noise conditions. In addition, the present application investigates bottleneck (BN) features extracted from deep autoencoder (DAE) networks trained by using acoustic features extracted from the speech signal. It is demonstrated that such representations not only produce robust systems, but that they also can be used to perform data selection for unsupervised model adaptation. The results discussed in the examples provided at the end of the present application indicate that the techniques presented in this application significantly improve performance of speech recognition systems in unseen channel and noise conditions.

Deep neural network (DNN) hidden Markov models (HMM)-based automatic speech recognition (ASR) systems demonstrate impressive performance as long as the training and evaluation conditions are similar. Unfortunately, DNN-HMM systems are both data hungry and data sensitive. DNN acoustic models can be quite sensitive to acoustic condition mismatch, where a subtle change in the background acoustic conditions due to noise, reverberation, and/or channel distortion can expose such models' weakness. Typically, multi-condition training supported by data augmentation is used to compensate for DNN acoustic model weakness, with literature reporting that robust DNN acoustic models can be trained with thousands of hours of acoustic data collected from diverse sources. Data augmentation is also found to have a significant impact. In all such conditions, the assumption is that there is an a priori knowledge about the kind of distortion the model will see, which often may not be the case. Real-world ASR applications typically encounter diverse acoustic conditions, which are often unique and hence difficult to anticipate. One such condition is channel variation and noise, which is practically an open-set problem.

Figure 1:
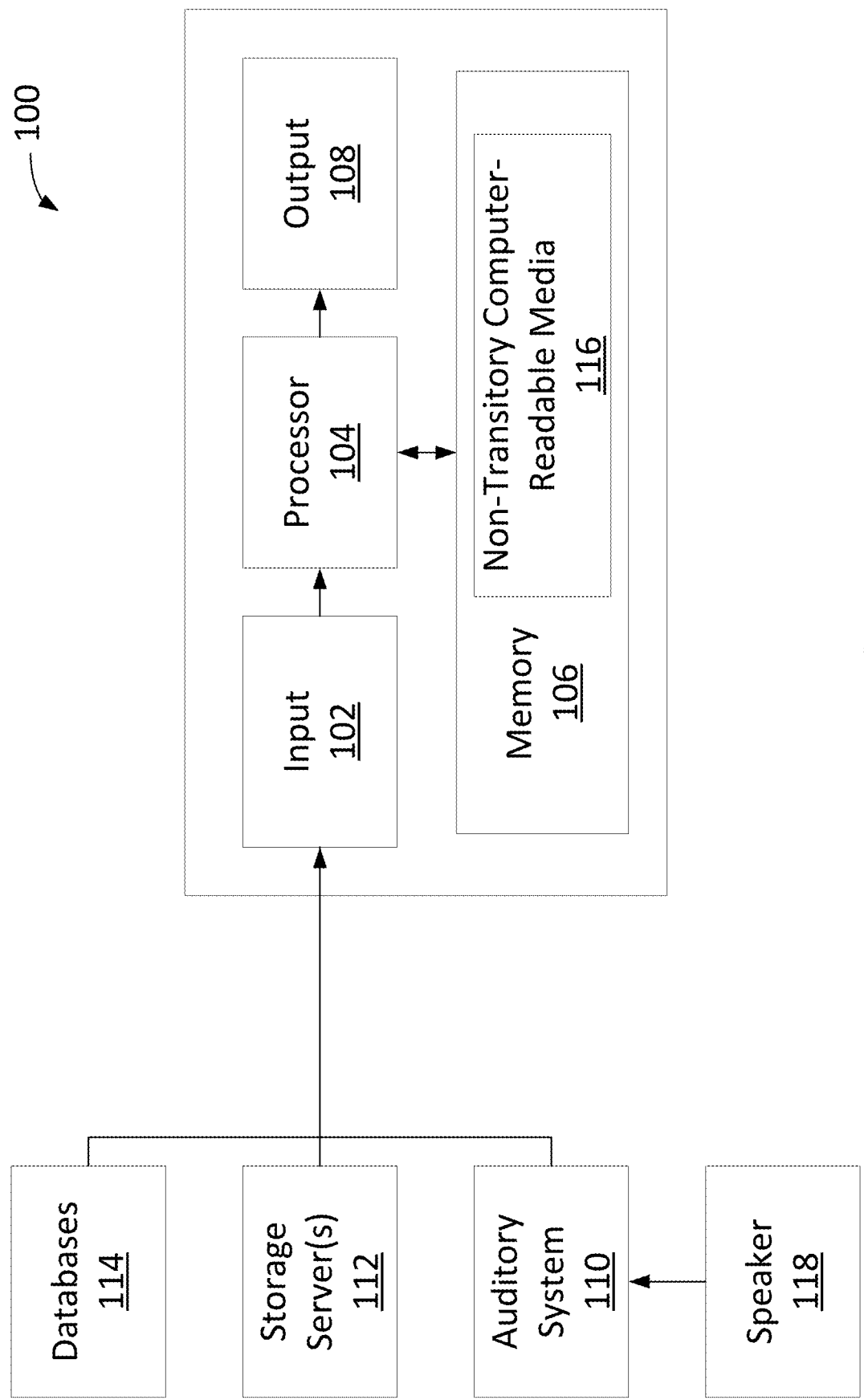
FIG. 1 depicts a simplified block diagram of at least one embodiment of an exemplary system, in accordance with aspects of the present disclosure.

Turning now to FIG. 1, a block diagram of an example system 100, in accordance with aspects of the present disclosure, is shown. In general, the system 100 may include an input 102, a processor 104, a memory 106, and an output 108, and may be configured to carry out steps analyzing auditory samples for speech recognition in accordance with aspects of the present disclosure.

As shown in FIG. 1, the system 100 may communicate with one or more of an auditory system 110, storage servers 112, or databases 114, by way of a wired or wireless connection to the input 102. In general, the system 100 may be any device, apparatus or system configured for carrying out instructions for, and may operate as part of, or in collaboration with various computers, systems, devices, machines, mainframes, networks, and/or servers.

In some aspects, the system 100 may be a portable or mobile device, such as a cellular or smartphone, laptop, tablet, and the like. In this regard, the system 100 may be a system that is designed to integrate a variety of software and hardware capabilities and functionalities, and/or may be capable of operating autonomously. In addition, although shown as separate from the auditory system 110, in some aspects, the system 100, or portions thereof, may be part of, or incorporated into the auditory system 110.

The input 102 may include any one or more different input elements, such as a mouse, keyboard, touchpad, touch screen, buttons, and the like, for receiving various selections and operational instructions from a user. The input 102 may also include various drives and receptacles, such as flash-drives, USB drives, CD/DVD drives, and other computer-readable medium receptacles, for receiving various data and information. To this end, input 102 may also include various communication ports and modules, such as Ethernet, Bluetooth, or WiFi, for exchanging data and information with these, and other external computers, systems, devices, machines, mainframes, servers or networks.

In addition to being configured to carry out various steps for operating the system 100, the processor 104 may also be programmed to analyze auditory samples for speech recognition according to methods described herein. Specifically, the processor 104 may be configured to execute instructions, stored in the memory 106 in a non-transitory computer-readable media 116. The instructions executable by the processor 104 may correspond to various automatic speech recognition (ASR) systems, examples of which will be described below. Although the non-transitory computer-readable media 116 is shown in FIG. 1 as included in the memory 106, it may be appreciated that instructions executable by the processor 104 may be additionally or alternatively stored in another data storage location having non-transitory computer-readable media.

In some aspects, the processor 104 may be configured to receive and process an audio signal to generate a variety of information, including text strings, text-based commands, hypothesis confidence levels, as well as other data. In some aspects, the processor 104 may access information and data, including audio signals, stored in or emitted by the auditory system 110, storage server(s) 112, database(s) 114, or other data storage locations using the input 102. In some aspects, the auditory system 110 may acquire an audio signal continuously using, for example, a microphone or other audio recording device to continuously record utilizing a speaker 118.

Embodiments of the present disclosure may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto the system 100 as described with reference to FIG. 1, as well as any other computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as instructions embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as instructions embodied in computer-readable program code logic, may also be stored in a computer-readable memory in the form of non-transitory computer-readable media, that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit ("CPU"), and computer are used synonymously to denote a device capable of executing the instructions and communicating with input/output interfaces and/or peripheral devices.

Figure 2:
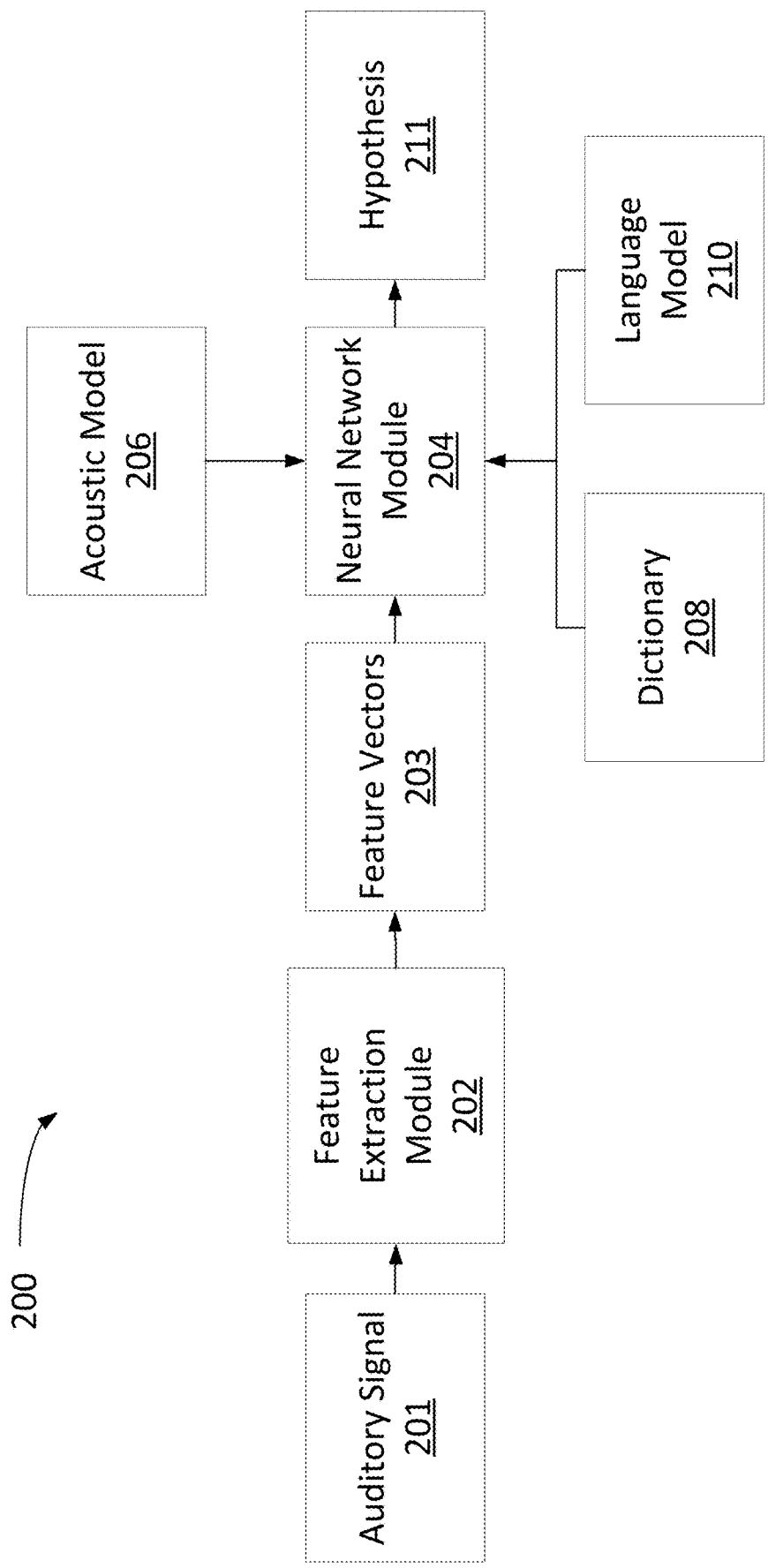
FIG. 2 depicts a simplified block diagram of at least one embodiment of an automatic speech recognition system, in accordance with aspects of the present disclosure.

Referring now to FIG. 2, a block diagram of an exemplary ASR system 200 is shown, wherein steps performed within the ASR system 200 may be executed by the processor 104. For example, the processor 104 may receive an audio signal or utterance 201 through the input 102, which can then be processed using the illustrated ASR system 200, as described in detail below.

It should be noted that the following description of the ASR system 200, as well as the accompanying figures, are meant to be illustrative and are in no way meant to be limiting. Other ASR systems can be arranged differently and can include different components or modules, while still being capable of performing the features disclosed in the present application.

As illustrated, the ASR system 200 can include a feature extraction module 202, a neural network module 204, an acoustic model 206, a dictionary 208, and a language model 210.

In processing the audio signal or utterance 201, the ASR system 200 may receive the utterance 201, which may include an analog or digital representation of human speech, such as, for example, a spoken word, multiple words, a phrase, multiple phrases, a sentence, multiple sentences, or other segment(s) of speech from the input 102.

The utterance 201 can then be sent to the feature extraction module 202, which can split the utterance 201 into various acoustic features represented by feature vectors 203. Specifically, the feature analysis module 202 may sample and quantize the utterance 201 within a time sequence of overlapping or non-overlapping temporal frames, and perform spectral analysis on the frames to derive the feature vector 203 associated with each frame.

The feature vectors 203 can then be sent to a neural network module 204, which can include any of a deep neural network (DNN), a convolutional neural network (CNN), a time-convolutional neural network (TCNN), a time-frequency CNN (TFCNN), and a fused CNN (fCNN), each of which will be discussed below. The neural network module 204 can then be used to produce a hypothesis 211 for the given utterance 201.

The hypothesis 211 can be determined by first training the neural network module 204 using the acoustic model 206, the dictionary 208, and the language model 210. During training, the acoustic model 206 may be used to model the observed data, as represented in the feature vectors 203, subject to guidance and constraints supplied by the dictionary 208 and the language model 210. The modeling process determines probabilities that a particular sequence of feature vectors 203 were derived from particular sequences of spoken sub-word sounds. Modeling may also involve probabilistic mapping of sequences of feature vectors 203 to one or more fundamental speech units (e.g., phonemes, triphones, quinphones, etc.) from among a stored corpus of fundamental speech units.

The language model 210 may assign probabilities to sequences of phonemes, triphones, quinphones, or words, based on the likelihood of a sequence of phonemes, triphones, quinphones, or words occurring in the utterance 201 inputted into the ASR system 200. For example, the language model 210 may determine the conditional probability of $w_n$ (the nth word in a phrase transcribed from the utterance 201), given the values of the pattern of n–1 previous words in the phrase. This conditional probability can be expressed as $P(w_n|w_1, w_2, \ldots, w_{n-1})$.

Once the neural network module 204 produces the hypothesis 211, the processor 104 can then use the hypothesis 211 to perform a variety of programmed tasks including outputting a text string, which may optionally include a text string confidence level, to a display, perform a text-based command, or any other predetermined response.

Figure 3:
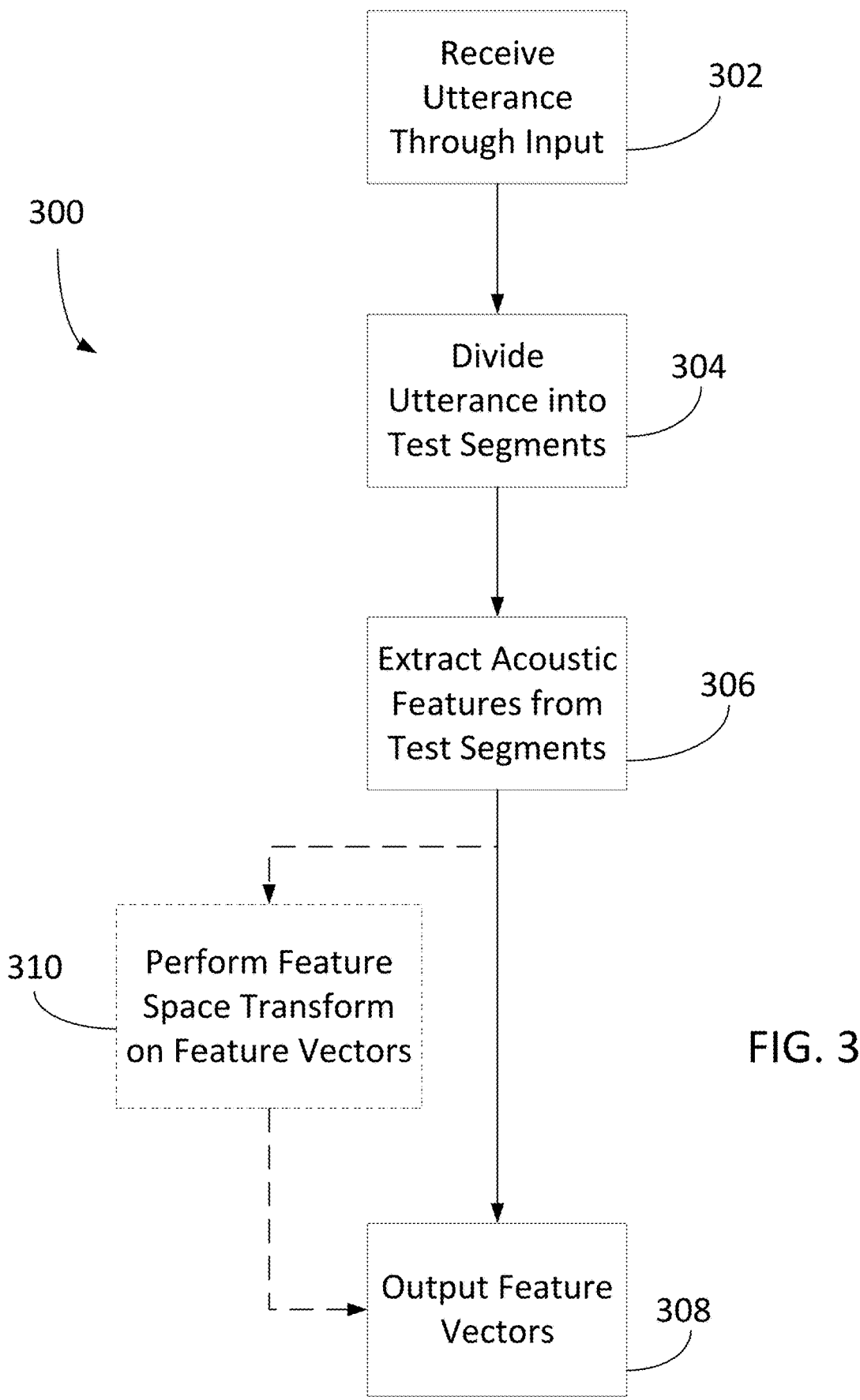
FIG. 3 is a flowchart setting forth steps of operation for a feature extraction module, in accordance with aspects of the present disclosure.

FIG. 3 shows a flowchart 300 detailing the various steps of operation for the feature extraction module 202. The utterance 201 can first be received through the input 102, at step 302. The utterance 201 can then be divided into a plurality of test segments, at step 304. For example, each test segment can be acquired in a sliding time window, or analysis window, that is periodically advanced. Each advance of the time window could be in increments measured in fractional units of the width of the time window. For example, the width of each frame (and of the sliding time window) could be 26 milliseconds (ms), and the time increment between each frame acquisition (or the frame rate) could be 10 ms. With this configuration, each new 26 ms frame would advance by 10 ms past the end of the previous frame, and the first 16 ms of each new 26 ms frame would overlap with the last 16 ms of the previous frame. Thus, every two consecutive frames would contain 16 ms of common audio data (e.g., of an utterance). Any other suitable frame sizes, window sizes, and frame rates can be used as well.

Once the utterance 201 has been divided into the plurality of test segments, at step 304, acoustic features, represented by the set of feature vectors 203, can be extracted from each of the test segments, at step 306. The feature vectors 203 can represent quantitative measures of the acoustic features of the corresponding test segment. In some instances, the acoustic features can be extracted by performing a spectral analysis on the test segments creating feature vectors 203. The spectral analysis can be used to extract gammatone filterbank energies (GFBs), normalized modulation coefficients (NMCs), mel-filterbank energies (MFBs), mel-frequency cepstral coefficients (MFCCs), and/or any other suitable acoustic features for speech recognition. In some instances, each test segment can be duplicated into two or more identical test segments. By duplicating the test segments, two or more distinct sets of acoustic features can be extracted from the "same" or identical test segments. This can provide a more robust set of feature vectors 203 to be used as inputs for the various types of neural networks described herein.

In some instances, after the set of feature vectors 203 has been extracted from the test segments, at step 306, the feature vectors 203 can be directly outputted, at step 308, into the neural network module 204.

In some other instances, however, a feature space transform can be performed on the feature vectors 203, at step 310, prior to outputting the feature vectors 203 into the neural network module 204. The feature space transform can be used to generate a normalized form of the feature vectors 203. By normalizing the feature vectors 203, various sources of unexpected or undesired noise can be removed from or reduced within the utterance 201.

The various types of noise can include any of a multitude of unusual artifacts, such as nonlinearity, frequency shifts, modulated noise, and intermittent bursts. The feature space transform can be any of a feature space maximum linear likelihood regression (fMLLR) transform, spectral subtraction, vocal tract length normalization, constrained maximum likelihood regression, speaker adaptive training, cluster adaptive training, and feature space minimum phone error.

Additionally, in the instances where the test segments are duplicated, the feature space transform can be performed on each distinct set of acoustic features, thereby providing multiple distinct feature-space transformed sets of acoustic features taken from a single test segment. This allows for a robust set of normalized vectors 203 to be inputted into any of the various neural networks described herein.

Figure 4:
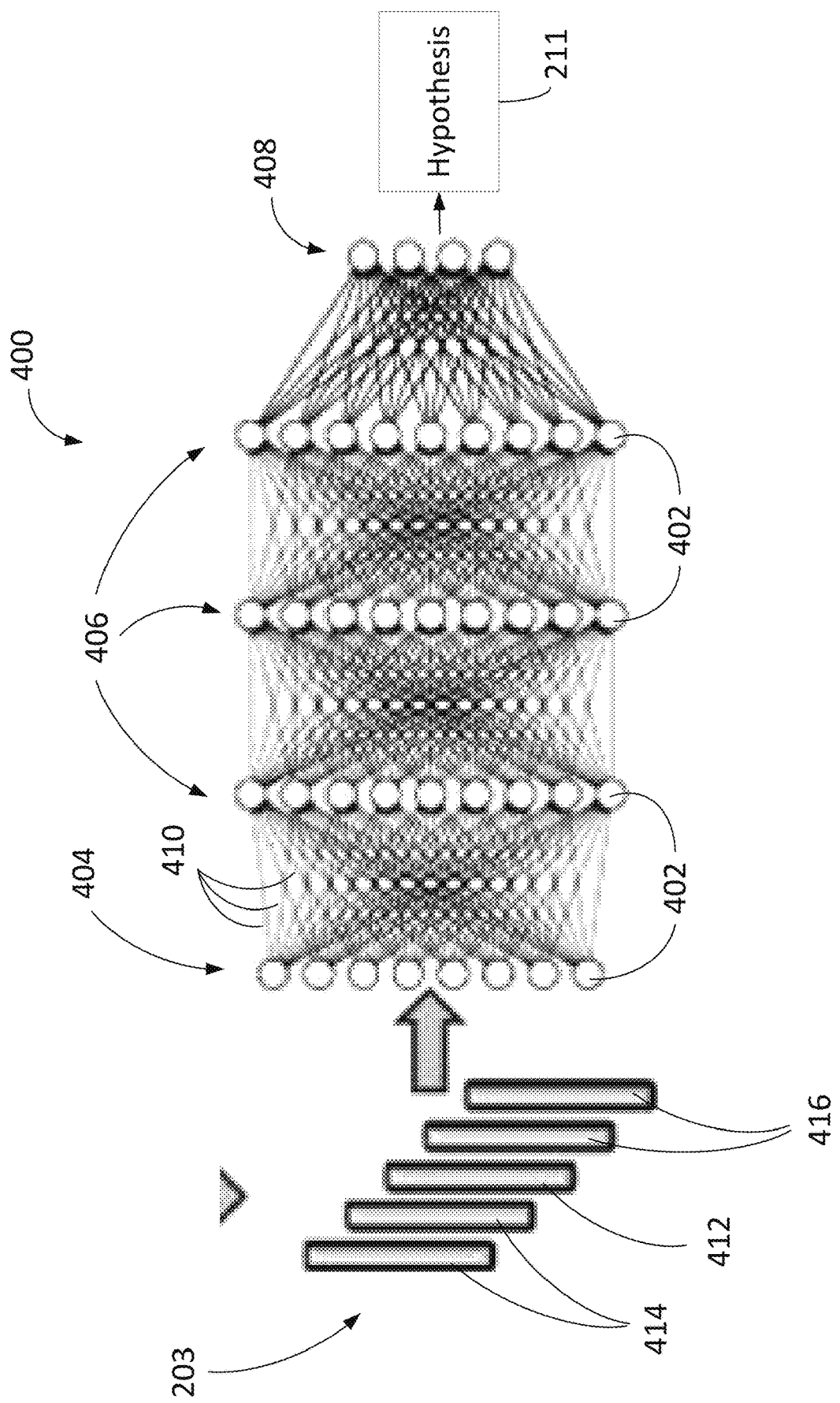
FIG. 4 is a schematic illustrating at least one embodiment of a deep neural network, in accordance with aspects of the present disclosure.

FIG. 4 illustrates an exemplary fully-connected deep neural network (DNN) 400 that can be implemented into the neural network module 204. The DNN 400 includes a plurality of nodes 402, organized into an input layer 404, a plurality of hidden layers 406, and an output layer 408. Each of the layers 404, 406, 408 are connected by node outputs 410. It will be understood that the number of nodes 402 shown in each layer is meant to be exemplary, and are in no way meant to be limiting. Accordingly, the number of nodes 402 in each layer can vary between 1000 to 2000 nodes 402. Similarly, the number of hidden layers 406 illustrated is again meant to be exemplary and can vary between four and six hidden layers 406. Additionally, although the illustrated DNN 400 is shown as fully-connected, the DNN 400 could have other configurations.

As an overview of the DNN 400, the feature vectors 203 can be inputted into the nodes 402 of the input layer 404. Each of the nodes 402 may correspond to a mathematical function having adjustable parameters. All of the nodes 402 may be the same scalar function, differing only according to possibly different parameter values, for example. Alternatively, the various nodes 402 could be different scalar functions depending on layer location, input parameters, or other discriminatory features. By way of example, the mathematical functions could take the form of sigmoid functions. It will be understood that other functional forms could additionally or alternatively be used. Each of the mathematical functions may be configured to receive an input or multiple inputs, and, from the input or multiple inputs, calculate or compute a scalar output. Taking the example of a sigmoid function, each node 402 can compute a sigmoidal nonlinearity of a weighted sum of its inputs.

As such, the nodes 402 in the input layer 404 take the feature vectors 203 in and then produce the node outputs 410, which are sequentially delivered through the hidden layers 406, with the node outputs 410 of the input layer 404 being directed into the nodes 402 of the first hidden layer 406, the node outputs 410 of the first hidden layer 406 being directed into the nodes 402 of the second hidden layer 406, and so on. Finally, the nodes 402 of the final hidden layer 406 can be delivered to the output layer 408, which can subsequently output the hypothesis 211 for the particular phoneme contained in an analysis test segment 412.

Prior to run-time usage of the DNN 400, the DNN 400 can be trained with labeled or transcribed auditory data. For example, during training, the utterance 211 may be labeled or previously transcribed. As such, the utterance 211 can be applied to the DNN 400, as described above, and the node outputs 410 of each layer, including the hypothesis 211, can be compared to the expected or "true" output values. In conjunction with the acoustic model 206, the dictionary 208, and the language model 210, this comparison can be used to produce a cross-entropy level for the various node outputs 410. Using the cross-entropy levels, the various parameters and weights used in the mathematical functions of the nodes 402 can then be updated by performing backpropagation using stochastic gradient descent to minimize the cross-entropy of the DNN 400. The parameters and weights can also be updated according to any other suitable methods.

As illustrated, the DNN 400 is considered "fully-connected" because the node output 410 of each node 402 of the input layer 404 and the hidden layers 406 is connected to the input of every node 402 in either the next hidden layer 406 or the output layer 408. As such, each node 402 receives its input values from a preceding layer 404, 406, except for the nodes 402 in the input layer 404 that receive the feature vectors 203 from the feature extraction module 202, as described above.

In some instances, contextual information for a given test segment may be helpful in accurately producing node outputs 410 and, ultimately the hypothesis 211. As such, the feature vectors 203 of an analysis test segment 412 to be analyzed may be spliced together with the feature vectors 203 of multiple preceding test segments 414 and succeeding test segments 416. This splicing can be used in conjunction with the conditional probability of $w_n$ for each word or word fragment in the utterance 201 obtained from the language model, as described above, to aid in the determination of the hypothesis 211.

Figure 5:
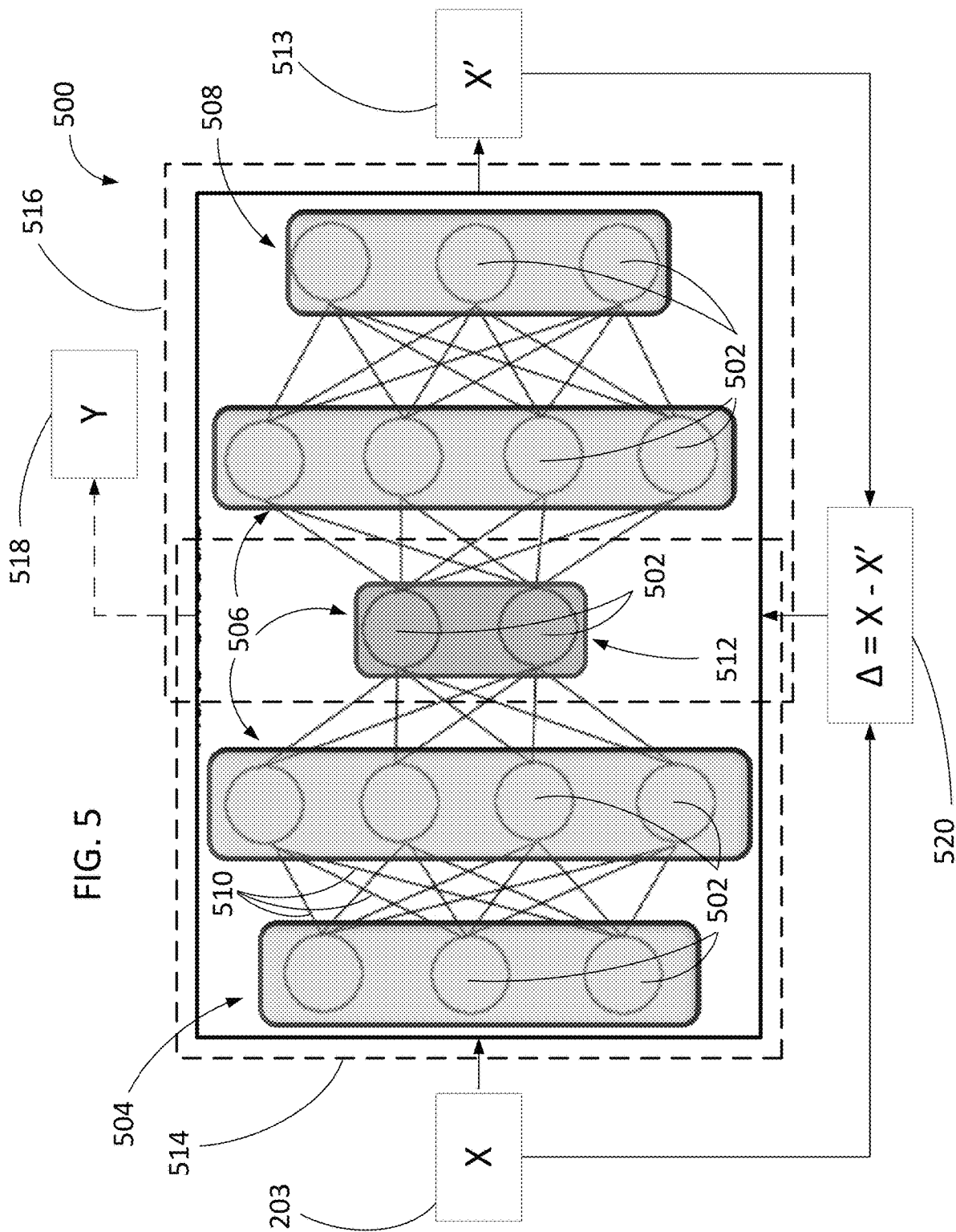
FIG. 5 is a schematic illustrating at least one embodiment of a deep autoencoder, in accordance with aspects of the present disclosure.

FIG. 5 illustrates a fully-connected deep autoencoder (DAE) 500 that can additionally or alternatively be implemented into the neural network module 204. Similar to the DNN 400, the DAE 500 includes a plurality of nodes 502, organized into an input layer 504, a plurality of hidden layers 506, and an output layer 508. Each of the layers 504, 506, 508 is again connected by node outputs 510. Furthermore, each of the nodes 502 may again correspond to a mathematical function having adjustable parameters.

However, the hidden layers 506 of the DAE 500 additionally include a DAE-bottleneck (DAE-BN) layer 512. The illustrated DAE 500 includes 3 hidden layers 506. The input layer 504 and output layers 508 each include 3 nodes 502, the first and third hidden layers 506 each include 4 nodes 502, and the bottleneck layer 512 is the middle hidden layer 506, and includes 2 nodes 502. It will again be appreciated that the illustrated number of nodes 502 and hidden layer 506 are both meant to illustrative of the relative layout of the DAE 500 and can be altered as desired.

An autoencoder, such as the DAE 500 behaves similarly to a deep neural network, such as the DNN 400 described above, but instead of outputting a hypothesis, the DAE 500 outputs a set of reproduced feature vectors 513 (represented by X') that should correspond to the feature vectors 203 inputted into the DAE 500 (represented by X). In some instances, the reproduced feature vectors 513 may be spliced identically to the feature vectors 203 inputted into the DAE 500. In some other instances, the reproduced feature vectors 513 may be spliced differently than the feature vectors 203 inputted into the DAE 500. In many instances, the DAE 500 can be considered to include an encoder 514 and a decoder 516. The encoder 514 can include the input layer 504, at least one hidden layer 506 (not including the bottleneck layer 512), and the bottleneck layer 512. The encoder 514 can take in the feature vectors 203 (represented by X) and process the feature vectors 203 to produce DAE-bottleneck (DAE-BN) features 518 (represented by Y) at the node outputs 510 of the bottleneck layer 512.

The decoder 516 can include the DAE-BN layer 512, at least one hidden layer 506 (not including the bottleneck layer 512), and the output layer 508. The decoder 516 can be configured to take the DAE-BN features 518 and output the set of reproduced feature vectors 513. As such, the functions used in the layers of the decoder 516 are essentially inversely related to the functions used in the layers of the encoder 514. It should be noted that by reducing the number of nodes 502 in the DAE-BN layer 512, the DAE-BN features 518 output from the DAE-BN layer 512 consist of lower-dimensional feature vectors, which may more accurately depict an invariant representation of the acoustic features, such that acoustic variations in the input audio signals taken from unseen channel and noise conditions have a lowered impact on the DAE-BN features 518, as compared to the feature vectors 203 inputted into the DAE 500.

Prior to run-time usage of the DAE 500, the DAE can be trained with labeled or unlabeled (unseen) data. For example, during training of the DAE 500, an error signal 520 can be computed by comparing the set of reproduced feature vectors 513 with the feature vectors 203 inputted into the DAE 500. The error signal 520 can then be minimized using mean squared error (MSE) backpropagation. Additionally or alternatively, the error signal 520 can be minimized using any other suitable method.

As alluded to above, because the DAE 500 is trained by comparing the reproduced feature vectors 513 to the feature vectors 203, the DAE 500 can be drained with far less labeled data than, for example, the fully-connected DNN 400 described above.

It should also be noted that the DAE-BN features 518 from the DAE 500 described herein are different than the previously proposed deep BN features from stacked autoencoders known in the art, in the sense that the DAE 500 was neither trained to denoise the input features nor trained layer-wise.

Figure 6:
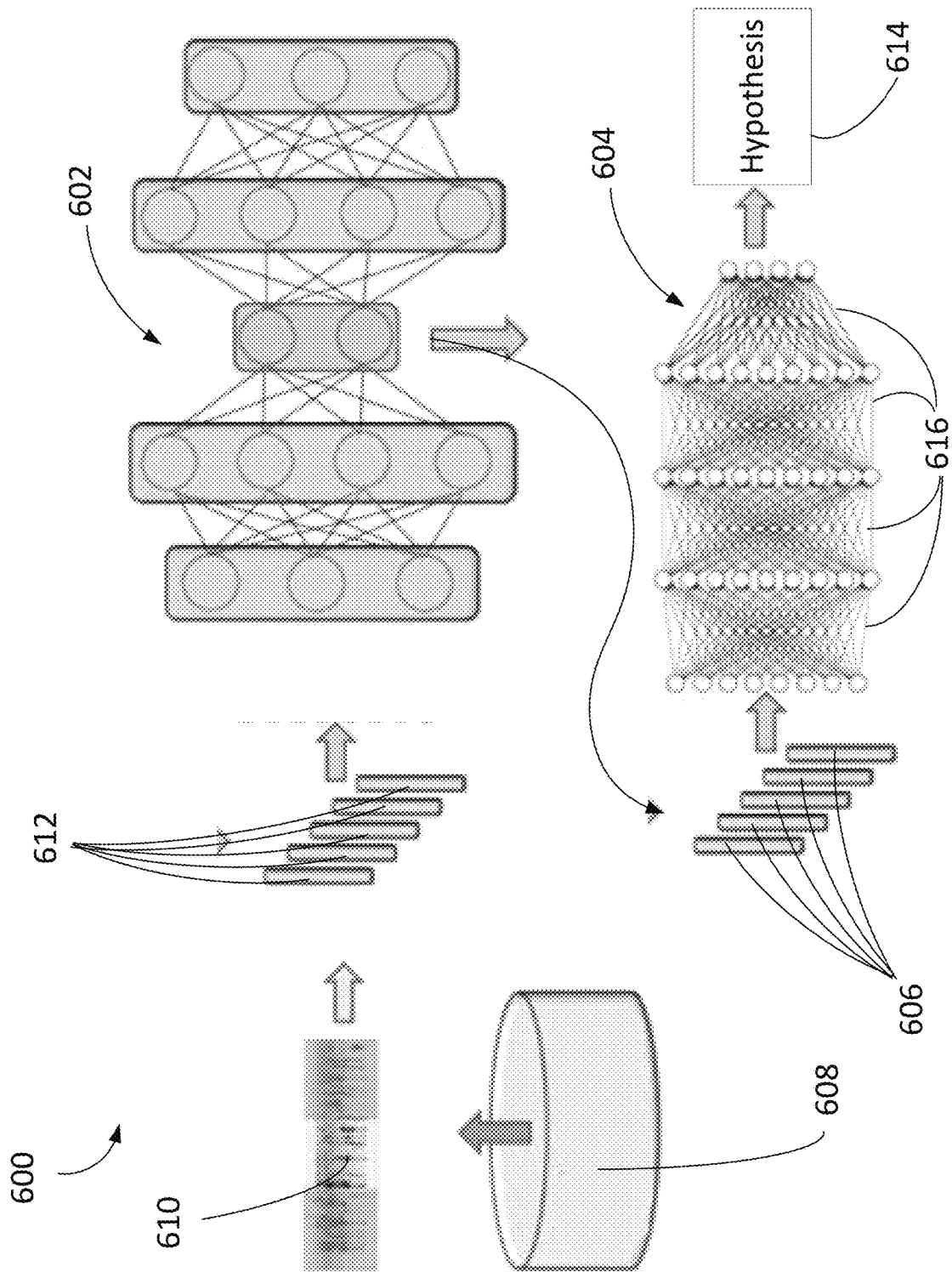
FIG. 6 is a schematic illustrating at least one embodiment of a neural network system, in accordance with aspects of the present disclosure.

Referring now to FIG. 6, a neural network (NN) system 600 is shown. The NN system 600 includes both a DAE 602 (similar to the DAE 500 discussed above) and a fully-connected DNN 604 (similar to the DNN 400 discussed above). The NN system 600 is trained by first training the DAE 602, and subsequently extracting training DAE-BN features 606 from the DAE 602 to retrain the DNN 604.

Specifically, a training corpus 608 provides training audio signals or utterances 610, from which training feature vectors 612 are extracted in accordance with the above description. The training feature vectors 612 are then inputted into the DAE 602 to train the DAE 602, as also described above. Once the DAE 602 has been trained, the training DAE-BN features 606 can be used to train the DNN 604 using cross-entropy of the hypothesis 614 and the various node outputs 616, as described above. By using the training DAE-BN features 606 to train the DNN 604, the lower dimensionality of the training DAE-BN features 606 provide a reduction in variability, as opposed to directly inputting the training feature vectors 612 into the DNN 604.

Figure 7:
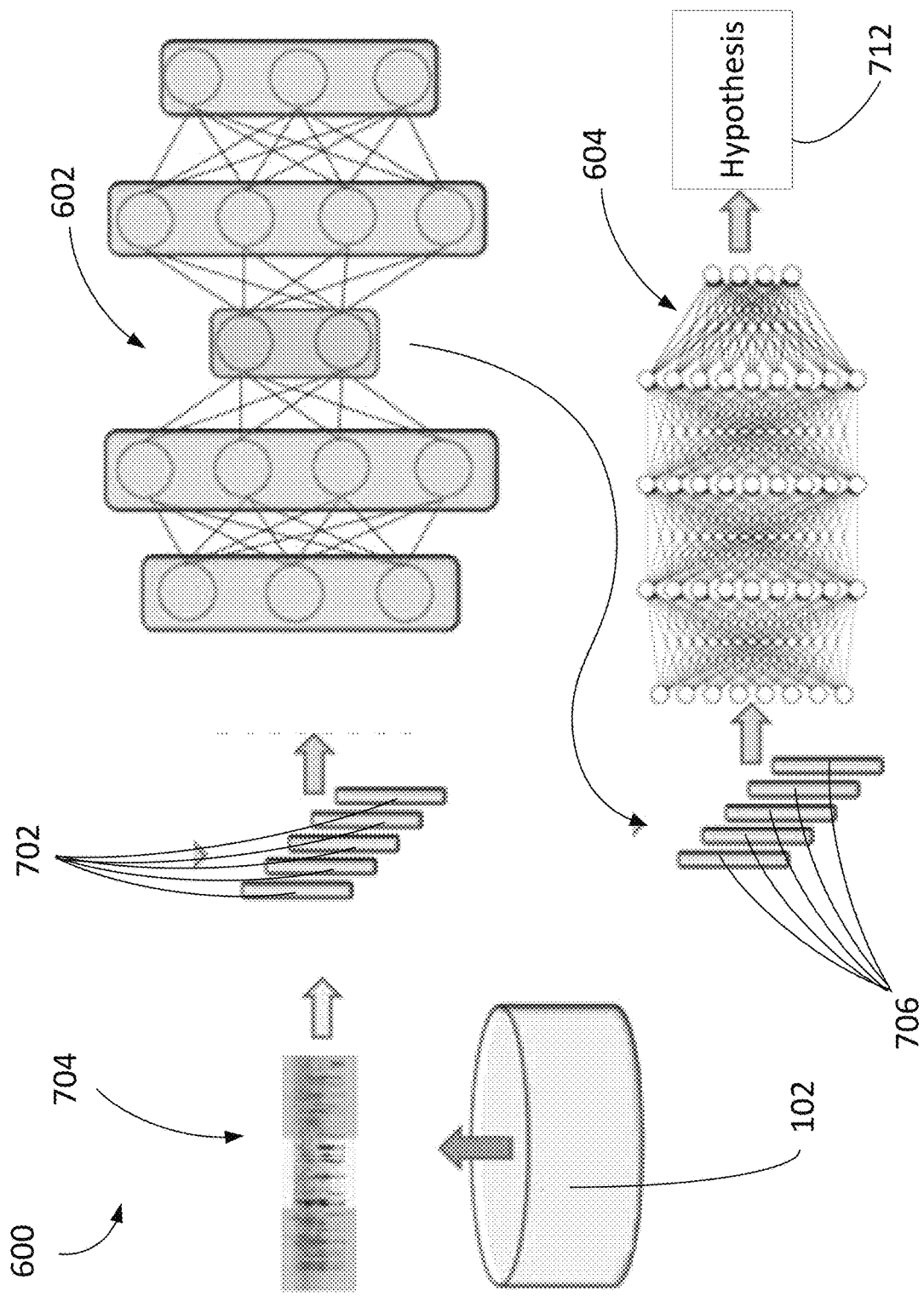
FIG. 7 is a schematic illustrating at least one embodiment of a neural network system, in accordance with aspects of the present disclosure.

Referring now to FIG. 7, once trained, the NN system 600 can be used for speech recognition by first extracting unseen feature vectors 702 from unlabeled audio signals 704 taken from unseen channel and noise conditions through the input 102, using the methods described above. The unseen feature vectors 702 can then be passed through the DAE 602 to produce unseen DAE-BN features 706. The unseen DAE-BN features 706 can then be inputted into the DNN 604, which can be used to provide a hypothesis 712, as described above with reference to the DNN 400. Because of the lower dimensionality of the DAE-BN features 706, the reduction in variability aids the DNN 604 in providing a more accurate hypothesis 712.

Furthermore, prior to inputting the unseen DAE-BN features 706 into the DNN 604, the DAE 602 can be adapted using the unlabeled audio signals 704. This adaption is achieved by simply retraining the DAE 602 using the unlabeled audio signals 704 during run-time usage, in accordance with the methods described above. By adapting DAE 602, the parameters and weights of the various connections in the DAE 602 are updated to better account for the various unseen noise conditions of the new audio signals 704. As such, the unseen DAE-BN features 706 should be closer to the training DAE-BN features 606 used to train the DNN 604, which should provide a more accurate hypothesis 712.

Figure 8A:
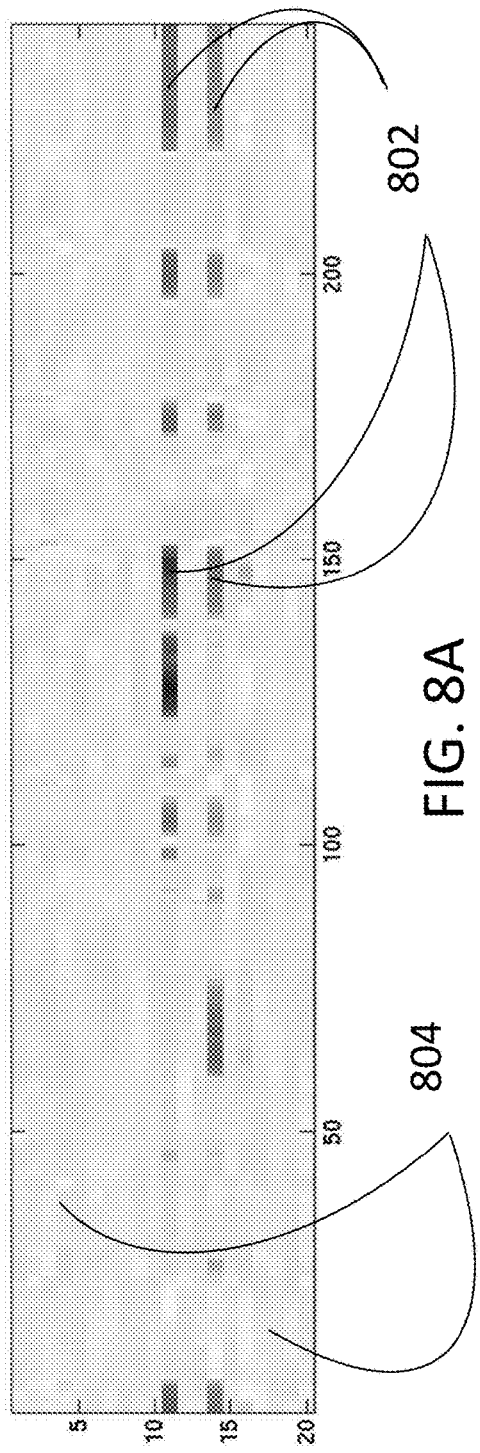
FIG. 8A is a chart showing activated deep autoencoder bottleneck layer neurons for a deep autoencoder when the deep autoencoder has received a source (or seen) audio signal.
Figure 8B:
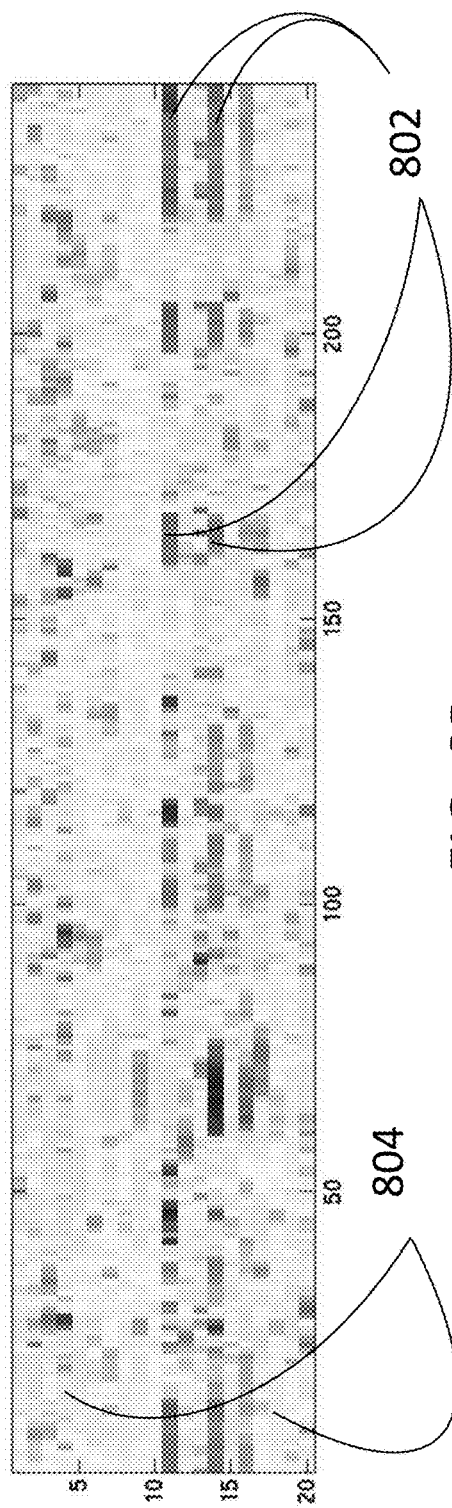
FIG. 8B is a chart showing activated deep autoencoder bottleneck layer neurons for a deep autoencoder when the deep autoencoder has received an unseen audio signal.

Turning now to FIGS. 8A and 8B, charts show activated DAE-BN layer neurons for a DAE, similar to the DAE 602 from the NN system 600. In FIG. 8A, the chart shows the neurons activated when the DAE has received feature vectors from a source (or seen) audio signal. In FIG. 8B, the chart shows the neurons activated when the DAE has received an unseen audio signal. Each chart include activated neurons 802, which have a dark color, and non-activated neurons 804. It is evident that for the unseen condition, several additional neurons in the DAE-BN layer are mistakenly triggered, and consequently, the cross-entropy of the DAE-BN activation outputs over this short term window can be expected to be higher for the unseen audio signal compared to the seen audio signal.

In a fully-connected neural network, such as any of the neural networks described above, unseen noise from a noisy test segment can propagate throughout the entire neural network, which may cause a total failure of the neural network, resulting in an incorrect hypothesis. As such, it may be useful to use this higher cross-entropy to identify particularly noisy test segments within unseen audio signals, such that the test segments with high amounts of noise may be selectively removed from the audio signal prior to inputting the test segments into the DNN for processing. To identify test segments with the highest entropy levels, a normalized and ranked summary entropy measure (NRSE) can be generated, as will be described below.

Specifically, if a DAE-BN layer N has n neurons, each generating activations $x_i$ at a given instant of time t, where i=1:n, then we can estimate the entropy of those activations over a time window of m centered around t. In this case, if $X_{t,j}$ is a random vector representing the activations of neuron j at hidden layer N, over a time window m centered around t.

$$X_{t,j} = \left[ x_{t-\frac{m}{2}}, x_{t-\frac{m}{2}+1}, \ldots x_t, \ldots x_{t+\frac{m}{2}} \right] \quad (1)$$

The entropy of $X_{t,j}$ can be defined as $$H_{X_{t,j}} = -\Sigma p(x_i) \log[p(x_i)] \quad (2)$$

where i's are the possible values of x. It should be noted that, according to (2), the entropy is obtained for each activation j over a running window of m. Finally, once the run-time entropy is obtained from each of the n neurons in the $N^{th}$ hidden layer, a summary measure is obtained, by estimating the mean entropy for each activation and a predetermined top percentile entropy measures across the activations can be selected to generate the NRSE. In some instances, the predetermined top percentile entropy measures may be the top $30^{th}$ percentile entropy measure.

Once the NRSE is generated, the NRSE can be used to sort the test segments from each utterance. Then, the N lowest NRSE sorted test segments (i.e., the test segments with the lowest percentile cumulative entropy) can be used to create a single adaptation set of feature vectors that can be inputted into any of the above-described neural networks, which can then be used in accordance with the methods discussed above.

It should be noted that, although the NRSE described above is in reference to DAE-BN features (or DAE-BN output activations), the NRSE can be generated using the acoustic features (or output activations) of any hidden layer of any of the neural networks described herein.

Furthermore, one common source of noise in unseen audio signals is reverberation. Reverberation results in temporal smearing of spectral information in acoustic signals. The extent of reverberation is determined by the characteristics of a room impulse response. Temporal smearing due to reverberation can be minimized by using a convolutional neural network (CNN) that performs time-convolution to do inverse filtering of room reverberation. This type of neural network can be referred to as a time-convolutional neural network (TCNN). However, it may be useful to provide a modified convolutional network that performs two levels of convolutional operation on the acoustic feature space: convolution across time (to mitigate temporal smearing of information due to reverberation) and convolution across frequency (to minimize the effect of noise).

Figure 9:
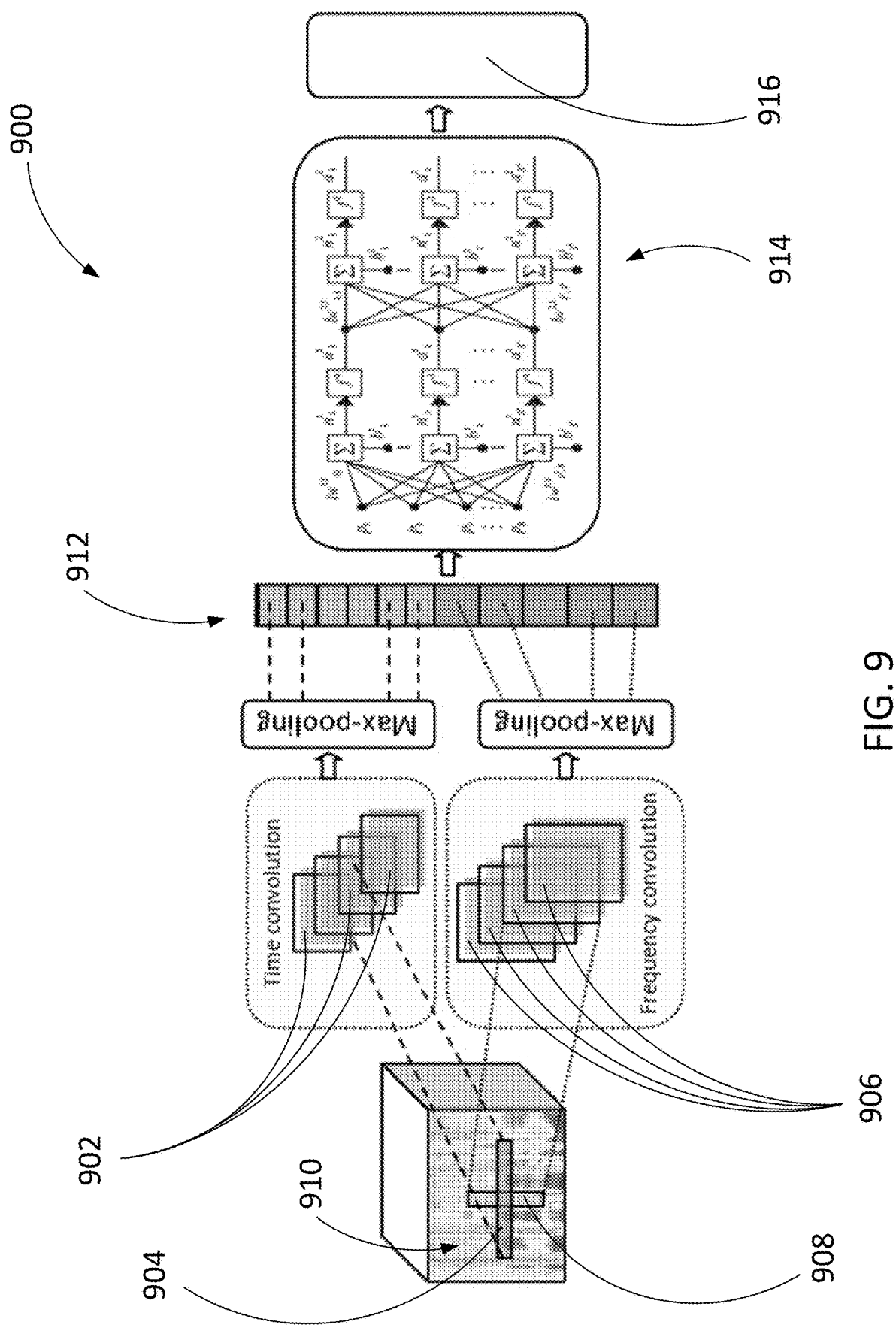
FIG. 9 is a schematic illustrating at least one embodiment of a time-frequency convolutional neural network, in accordance with aspects of the present disclosure.

Referring now to FIG. 9, a time-frequency convolutional neural network (TFCNN) 900 is shown. In the TFCNN 900, acoustic features 902 from a time convolution layer 904, and acoustic features 906 from a frequency convolution layer 908, are taken from an input feature map 910. The acoustic features 902 of the time convolution layer 904 are then combined, and the acoustic features 906 of the frequency convolution layer 908 are combined, using max-pooling. Max-pooled features 912 are then fed to a single fully connected DNN 914 to produce a hypothesis 916

Described below is an explanation of how time and frequency convolution followed by max-pooling can be performed.

An input feature map can be represented by either feature vectors V or U where:

$$V=[V_1, V_2, \ldots V_f \ldots V_F] \quad (3)$$

$$U=[U_1, U_2, \ldots U_t \ldots U_T]^T \quad (4)$$

where, $V_f$ represents the feature vector at frequency band f and $U_t$ represents the feature vector at a time frame t. Note that, for simplicity, these feature vectors only represent the spectral energies, and their dynamic information ($\Delta$ and $\Delta\Delta$) is not used. For frequency convolution, the frequency convolution layer has K bands with N activations. The convolution layer activations after non-linear activation function operation can be represented as:

$$h_{k,n} = \sigma(\Sigma_{b=1}^{B-1} w_{b,n} V_{b+k}^T + \beta_n) \quad (5)$$

where $\sigma(\cdot)$ is the output activation function; B is the band size for convolution operation on V; $\omega$ and $\beta$ represents the weight and bias terms of the convolution layer. Similarly for time convolution, the time convolution layer has L bands (operating on time frames) and M activations. In this case, the convolution layer activations after non-linear activation function operation can be represented as:

$$g_{l,m} = \sigma(\Sigma_{c=1}^{C-1} \omega_{c,m} U_{c+m} + \gamma_n) \quad (6)$$

where $\sigma(\cdot)$ is the output activation function; C is the frame-band size for convolution operation on U; $\omega$ and $\gamma$ represents the weight and bias terms of the time convolution layer. Now, after the pooling layer the outputs of each of these layers can be represented as:

$$p_{b,n} = \max_r (h_{b \times i + r, n}) \quad (7)$$

$$q_{c,l} = \max_s (q_{c \times j + s, l}) \quad (8)$$

where, r and s are the pooling size, i and j are the sub-sampling factor, b and c are the pooling band sizes for frequency and time convolution layers respectively. The output feature space can be flattened to a vector, concatenated, and fed to the fully connected neural net. In some instances, TFCNNs may use 75 filters to perform time convolution, and may use 200 filters to perform frequency convolution. Additionally for time and frequency convolution, eight bands may be used. In some instances max-pooling over three samples may be used for frequency convolution, while max-pooling over five samples may be used for time convolution.

To help the acoustic model learn inverse filtering on reverberated data, it is necessary to train the model with reverberated and noisy data. Several studies have shown that using an increased diversity of reverberation conditions through multi-conditioned training improves the robustness of acoustic models by reducing acoustic-condition mismatch between the training and testing data. The training data can be artificially reverberated using multiple room conditions (with different size and different room-impulse-responses) and varying background noise conditions at different signal-to-noise ratios (SNRs). Data augmentation with varying acoustic conditions helps to improve the performance of the acoustic models by letting the models estimate inverse filters that would help to minimize acoustic distortions. In the studies resulting in the present disclosure, multi-conditioned trained TFCNNs were used and it was demonstrated that such models perform robustly under real reverberated and noisy acoustic conditions.

It should be noted that any of the above-described acoustic features including, but not limited to, gammatone filterbank energies, normalized modulation coefficients, mel-filterbank energies, mel-frequency cepstral coefficients, and/or any other suitable acoustic features for speech recognition can optionally be feature space transformed using any of the above-described types of feature space transforms including, but not limited to, feature space maximum linear likelihood regression, spectral subtraction, vocal tract length normalization, constrained maximum likelihood regression, speaker adaptive training, cluster adaptive training, and feature space minimum phone error. Any of these feature space transformed or non-feature space transformed acoustic features can subsequently be inputted into any of the above-described neural networks including, but not limited to, deep neural networks, convolutional neural networks, fused convolutional neural networks, time convolutional neural networks, time-frequency convolutional neural networks, and/or any other suitable neural networks.

Figure 10:
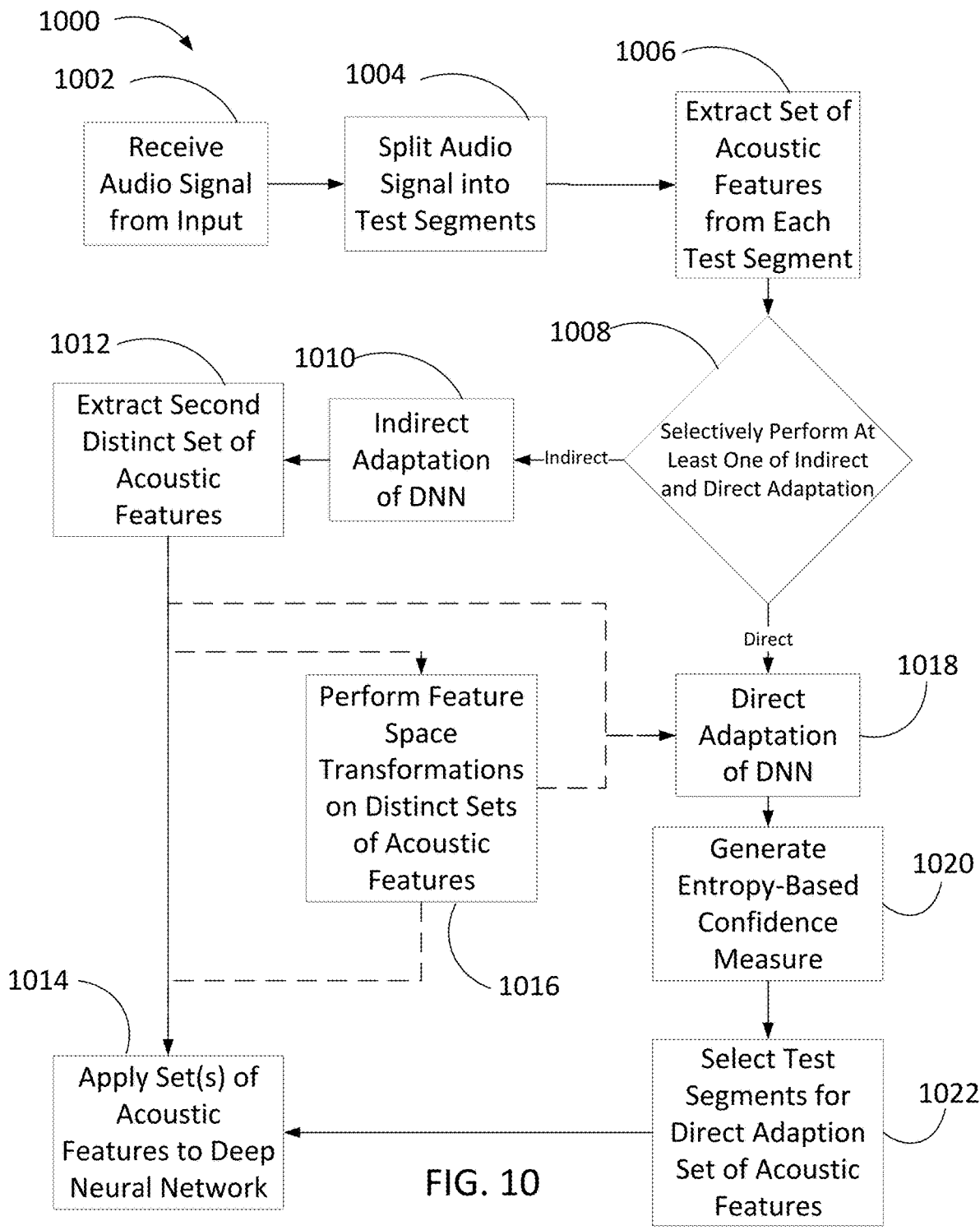
FIG. 10 is a flowchart setting forth steps of an exemplary method of use for the exemplary system of FIG. 1, in accordance with aspects of the present disclosure.

Referring now to FIG. 10, flowchart 1000 is shown consisting of steps of an exemplary method of use for the system 100 of FIG. 1 employing the various advantageous neural network improvements described herein. First, the processor 104 can receive an audio signal from the input 102, at step 1002. The processor 104 can then split the audio signal into a plurality of test segments, at step 1004, according to the methods described herein. The processor 104 can then extract a set of acoustic features from each of the test segments, at step 1006, in accordance with any of the methods described herein.

After a set of acoustic features has been extracted from the test segments, at step 1006, the processor 104 is configured to selectively perform at least one of indirect and direct adaptation of the deep neural network being used, at decision step 1008. The deep neural network being adapted can be any of the deep neural networks described herein, including the DNN, CNN, TCNN, and the TFCNN, but for clarity will be referred to generally as a deep neural network (DNN) in the following description of the steps described in the flowchart 1000. The selection by the processor 104 at decision step 1008 can be based on a user input, characteristics of the input audio signal, calculation time requirements, or any other applicable selection bases, which can be predetermined before run-time usage.

When the processor 104 selectively performs indirect adaptation of the DNN, at step 1010, the processor 104 can be configured to extract at least a second distinct set of acoustic features from each test segment, at step 1012. This can be done by duplicating each test segment at least once, as described above with respect to FIG. 2, and performing distinct spectral analyses on each of the original test segment and the identical duplicated test segments. Once the second (and possibly a third, fourth, etc.) distinct set(s) of acoustic features has been extracted from the corresponding test segment, each of the distinct sets of acoustic features extracted from the test segments, including both the originally extracted set of acoustic features and the additional sets of acoustic features extracted from the duplicated test segments, can be applied to the deep neural network, at step 1014, thereby creating a fused DNN (fDNN) or a fused CNN (fCNN). Optionally, prior to applying the distinct sets of acoustic features to the deep neural network, at step 1014, a feature space transformation can be performed on each distinct set of acoustic features, at step 1016. The feature space transformation can be any of the feature space transformations discussed above, but in many instances may be a feature-space Maximum Linear Likelihood Regression transformation. As also discussed above, the additional distinct sets of acoustic features provide a more robust set of acoustic features to the deep neural network. Furthermore, the feature space transformations can help to normalize the various sets of acoustic features, thereby removing or reducing unwanted noise within the received audio signal. These methods can improve hypothesis accuracy of the DNN when the processor 104 is processing audio signals from unseen and noisy channel conditions.

When the processor 104 selectively performs direct adaptation of the DNN, at step 1018, the processor can be configured to apply the acoustic features to a pre-trained deep neural network to generate an entropy-based confidence measure, at step 1020, in accordance with the methods described above. The pre-trained deep neural network can similarly be any of the deep neural networks described herein, including the standard DNN, the CNN, the TCNN, the TFCNN, or the fCNN (as will be described below). The entropy-based confidence measure generated, at step 1020, can then be used to select the test segments with the lowest overall cumulative entropy to establish a direct adaptation set of acoustic features, at step 1022, as described above with reference to FIGS. 8A and 8B. Once the test segments have been selected for the direct adaptation set of acoustic features, at step 1022, the direct adaptation set of acoustic features can be applied to the DNN, at step 1014, in accordance with the methods described above.

Furthermore, in some instances, the processor 104 can decide to perform both indirect and direct adaptation of the DNN. In this case, the processor 104 can first perform indirect adaptation of the DNN at step 1010. This can include extracting the second distinct set of acoustic features, at step 1012, and optionally performing the feature space transformation of the distinct sets of acoustic features, at step 1016. The feature space transformed, or non-feature space transformed, distinct sets of acoustic features extracted during the indirect adaptation of the DNN can then be used in direct adaptation of the DNN, at step 1018. The feature space transformed, or non-feature space transformed, distinct sets of acoustic features can then be applied to the pre-trained DNN to generate the entropy-based confidence measure, at step 1020. Again, using the entropy-based confidence measure, the test segments can be selected for the direct adaption set of acoustic features, at step 1022. Finally, the direct adaptation set of acoustic features, containing the additional sets of feature space transformed, or non-feature space transformed, distinct acoustic features can be applied to the DNN to produce a hypothesis, in accordance with the above-described methods and systems.

In addition to the descriptions above, specific experiments are provided below, in accordance with the present disclosure. These experiments are offered for illustrative purposes only, and are not intended to limit the scope of the present invention in any way. Indeed, various modifications in addition to those shown and described herein will become apparent to those skilled in the art from the foregoing description and the following example and fall within the scope of the appended claims.

Experiments

Reference is now made to the following experiments, which together with the above descriptions illustrate the invention in a non-limiting fashion. In the following experiments, various DNN, CNN, TCNN, TFCNN, and fCNN acoustic models were trained using a variety of feature-space transformed and non-feature-space transformed acoustic features. System performance is reported in terms of word error rates (WERs).

The Speech Recognition System

The speech dataset used in the following experiments was collected by the Linguistic Data Consortium (LDC) under DARPA's RATS program, which focused on speech in noisy or heavily distorted channels in two languages: Levantine Arabic (LAR) and Farsi. The data was collected by retransmitting telephone speech (denoted as source channel) through eight communication channels (denoted as A, B, C, D, E, F, G, and H), each of which had a range of associated distortions. The DARPA RATS dataset is unique in that the noise and channel degradations were not artificially introduced by performing mathematical operations on the clean speech signal; instead, the signals were rebroadcast through channel-degraded and noise-degraded ambience and then rerecorded. Consequently, the data contained several unusual artifacts, such as nonlinearity, frequency shifts, modulated noise, and intermittent bursts—conditions under which the traditional noise-robust approaches developed in the context of additive noise may not have performed well.

The experiments referred to at the end of this section focused only on the LAR dataset.

For LAR acoustic model (AM) training, approximately 250 hours of retransmitted conversational speech (LDC2011E111 and LDC2011E93) was used.

For language model (LM) training, various sources were used including:

1.3M words from the LDC's EARS (Effective, Affordable, Reusable Speech-to-Text) data collection (LDC2006S29, LDC2006T07);

437K words from Levantine Fisher (LDC2011E111 and LDC2011E93);

53K words from the RATS data collection (LDC2011E111);

342K words from the GALE (Global Autonomous Language Exploitation) Levantine broadcast shows (LDC2012E79); and 942K words from web data in dialectal Arabic (LDC2010E17).

A held-out set was used for LM tuning, which was selected from the Fisher data collection and contained approximately 46K words.

To evaluate ASR and keyword-spotting (KWS) performance for LAR, two test sets were used—referred to herein as dev-1 and dev-2. Each test set consisted of 10 hours of held-out conversational speech. Dev-2 did not come with reference transcriptions and was meant solely for KWS evaluation and as the focus was only on ASR, results will be reported on dev-1 only. Note that approximately 2K segments from each channel condition were used as a held-out validation set for model training and optimization.

The LAR data had eight channels denoted by A through H. In the experiments, channels A and B were removed from the training set (referred to here as "no A-B train") and the models were evaluated across all eight channels, as well as the source data (non-retransmitted data), that were distributed as the dev-1 set in the DARPA RATS distributions. In addition to the LAR data, 2500 hours of communication-channel-degraded Mandarin data were also used to train a DAE-BN system similar to those shown in FIGS. 5 and 6. It should be noted that the performance of the DAE-BN system improved with addition of the Mandarin training data.

In the following experiments, gammatone filterbank energies (GFBs) were used as one of the acoustic features for the experiments. Gammatone filters are a linear approximation of the auditory filterbank found in the human ear. For the GFB processing, the speech was analyzed by using a bank of 40 gammatone filters equally spaced on the equivalent rectangular bandwidth (ERB) scale. Within an analysis window of approximately 26 ms, the power of the bandlimited time signals was computed at a frame rate of 10 ms. The subband powers were then root-compressed by using the 15th root, and the resulting 40-dimensional feature vector was used as the GFBs.

Normalized modulation coefficients (NMCs) were also used as a candidate feature in the following experiments. NMCs capture the amplitude modulation (AM) information from bandlimited speech signals. NMCs track the AM trajectories of subband speech signals in a time domain by using a Hamming window of 26 ms with a frame rate of 10 ms. The powers of the AM signals were similarly root compressed by using the 15th root. The resulting 40-dimensional feature vector was used as the NMC feature in the experiments In addition to the above feature sets, standard mel-filterbank energies (MFBs) and mel-frequency cepstral coefficients (MFCCs) were also used as candidate feature sets.

The DAE-BN system used in the experiments was a five-hidden-layer, fully connected DNN system, with the third hidden layer containing a bottleneck of eighty neurons. The remaining hidden layers had 1024 neurons. The hidden layers had sigmoid activations, whereas the output layer had linear activation. The DAE-BN was trained by using mean squared error (MSE) backpropagation. The input to the DAE-BN system was 40 GFBs with a splicing of 11 (i.e., splicing the preceding 5 test segments and the succeeding 5 test segments with the test segment being analyzed), resulting in 440 dimensional features, whereas the output was the same 40 GFBs, but with a splicing of five.

Once trained, the sigmoid activation of the DAE-BN layer was replaced by a linear activation. The DAE-BN features from the DAE-BN system were then used to train a fully connected DNN acoustic model, as shown in FIG. 6.

It should be noted that the DAE-BN system was trained with all but channels A and B, for "no A-B train" data. The DAE-BN system was trained with the same input-output features, but the feature splicing on the input side was different than that of the output side, as mentioned above.

FIGS. 8A and 8B show the feature maps of first 20 dimensions of the DAE-BN features for source (relatively clean) data (shown in FIG. 8A) and unseen (channel A) retransmitted LAR data (shown in FIG. 8B). As also discussed above, it is evident that for the unseen condition, several of the neurons in the DAE-BN layer are mistakenly triggered, and consequently, the entropy of the DAE-BN activation outputs over a short-term window can be expected to be higher for the unseen case compared to the seen case. As such, the entropy of the DAE-BN activation outputs were used to generate an entropy-based confidence measure, similar to the NRSE described above, which was estimated from the DAE-BN features and was used to select test data and their first-pass hypothesis for unsupervised model adaptation.

The no A-B train data was used to train the multi-channel acoustic models, and the resulting models are referred to herein as the "no-AB models". A baseline model was also trained using all the training data, which included data from the source and the eight retransmitted channel versions. Initially, a three-state context dependent (CD) left-to-right GMM-HMM acoustic model was trained, which was used to generate the senone alignments for the DNN acoustic model training. The training corpus was clustered into pseudo-speaker clusters by using unsupervised agglomerative clustering.

Multiple DNNs were trained by using cross-entropy employing the senone alignments generated by the GMM-HMM acoustic model. The DNNs had five hidden layers of size 2048 with sigmoid activations, except for a DNN trained on the BN features from the DAE-BN system, which had three hidden layers with 2048 neurons. The DNNs were trained by using an initial four iterations with a constant learning rate of 0.008, followed by learning-rate halving based on cross-validation error decrease. Training stopped when no further significant reduction in cross-validation error was noted or when cross-validation error started to increase. Backpropagation was performed using stochastic gradient descent with a mini-batch of 256 training examples.

The LM was created by using SRILM (a toolkit for building language models). Using a held-out tuning set, a vocabulary of 47K words was selected for LAR, which resulted in an out-of-vocabulary (OOV) rate of 4.3% on dev-1.

Experiment 1—Baseline DNN Acoustic Models Comparing WERs for Seen Vs. Unseen Channels To assess the performance degradation due to unseen channel conditions, two DNN acoustic models were trained: (a) including the target channels (A, B) in the training data, (b) excluding the target channels (A, B) from the training data. Table 1 shows the WERs from these two systems when channels A, B, C and E are decoded from the dev-1 evaluation set.

TABLE 1

WERs from DNN models trained with MFB features, for dev-1 channels A, B, C, and E and the whole dev-1 data, for acoustic models trained with (a) all and (b) no A, B training data.

|  | dev-1 channels | | | | dev-1 |
| --- | --- | --- | --- | --- | --- |
|  | A | B | C | D | Avg. |
| Train with all | 70.6 | 68.2 | 75.8 | 70.2 | 62.8 |
| no A, B train | 99.5 | 98.0 | 78.2 | 73.4 | 72.6 |

Table 1 demonstrates the performance deterioration for the unseen channels, where the DNN models gave error rates more than 90%. The Table 1 results indicate the need for better strategies to prevent acoustic models from failing under unseen noise/channel conditions. It should be noted that the error rates reported in Table 1 are quite high, as Arabic acoustic models typically have higher WERs, and beyond that, channels A, B, C, and E are quite adverse channels that contain high levels of noise, channel degradations, and non-stationary artifacts.

Experiment 2—DNN Acoustic Models Trained with MFCC, MFB, NMC, and DAE-BN Acoustic Features Next, it was investigated how the recognition rates varied for different features for different channel conditions. Table 2 presents the WERs for the MFCC, MFB, and NMC features, when used with a five-hidden-layer DNN having 2048 neurons. Table 2 shows that the robust features failed to prevent the DNNs from failing under mismatched channel conditions, indicating the need for adaptation mechanisms to attain reasonable recognition accuracy.

TABLE 2

WERs from DNN model trained with GFB, MFB, NMC, and DAE-BN features for deu-1 channels A, B, C, and E, when trained with (a) all and (b) no A-B train data

| | Feature | dev-1 channels | | | | dev-1 all |
| --- | --- | --- | --- | --- | --- | --- |
| | | A | B | C | E | Avg. |
| No. A-B | MFCC | 100 | 98.5 | 81.6 | 83.6 | 78.8 |
| | MFB | 99.5 | 98.0 | 78.2 | 73.4 | 72.6 |
| | NMC | 92.9 | 93.9 | 76.6 | 73.0 | 70.6 |
| | DAE-BN | 79.3 | 82.6 | 80.6 | 78.5 | 71.5 |

Table 2 shows that the MFCC and MFB features failed for the unseen channel conditions; however, they were able to retain their performance for the seen channel conditions (comparing their performance from "All-trained" models in Table 1). The DAE-BN features were relatively robust for unseen channel conditions; however, their performance for the seen channel conditions was worse than that of the MFB and NMC features.

Experiment 3—DNN Acoustic Models Trained with fMLLR-Transformed MFCC, MFB, and NMC Acoustic Features Next, using fMLLR-transformed MFCC and MFB feature representations for training and testing the DNNs was explored. Table 3 presents the WERs for the fMLLR-transformed MFCC and MFB feature representations, and shows that fMLLR transform resulted in a significant performance improvement.

TABLE 3

WERs from DNN models trained with MFCC, MFB, and NMC features with fMLLF transform, for dev-1 channels A, B, C, E, and dev-1 all, for no A-B train data.

| | dev-1 channels | | | | dev-1 all |
| --- | --- | --- | --- | --- | --- |
| | A | B | C | E | Avg. |
| MFCC$_{fMLLR}$ | 75.9 | 80.6 | 76.7 | 73.8 | 67.1 |
| MFB$_{fMLLR}$ | 75.7 | 79.1 | 75.3 | 69.8 | 65.4 |
| NMC$_{fMLLR}$ | 76.4 | 79.6 | 75.2 | 70.7 | 65.7 |

Table 3 shows that the fMLLR transform significantly reduced the error rates for the unseen channels A and B, and brought them close to the error rates obtained from the seen-channel conditions reported in Table 1. It is also interesting to note that the fMLLR-transformed MFB features gave lower WER than the fMLLR-transformed MFCC features.

Experiment 4—CNN Acoustic Models Trained with fMLLR-Transformed MFB, NMC, and DAE-BN Acoustic Features It has been established that convolutional neural network (CNN) are typically robust against noise and channel distortions; therefore, CNN acoustic models were explored for use with the features presented above. Specifically, using CNN models on fMLLR-transformed MFB, NMC, and DAE-BN features was explored. Note that convolution across feature dimension is not meaningful for DAE-BN features, as the neighboring feature dimensions may not be as correlated as the spectral features. Hence, convolution was performed across time (time-convolutional neural net (TCNN)) only and used 75 filters with a band size of 8 and max-pooling over a window size of 5. For the other spectral features, NMC and MFBs, conventional CNNs were investigated that had 200 convolutional filters with a band size of 8 and max-pooling over three frames. The convolutional layers were connected with a four hidden-layer, fully connected neural net, where each layer had 2048 neurons. The results from the CNN models are shown in Table 4, where it can be seen that for all features, except the DAE-BN features, further reduction in WER was observed for both seen and unseen channel conditions compared to the DNN models.

TABLE 4

WERs from CNN models trained with fMLLR transformed MFB, NMC, and DAE-BN features for dev-1 channels A, B, C, E, and dev-1 all, for the no A-B train condition.

| | Model | dev-1 channels | | | | dev-1 |
| --- | --- | --- | --- | --- | --- | --- |
| | | A | B | C | E | Avg. |
| MFB$_{fMLLR}$ | CNN | 72.8 | 76.4 | 73.8 | 67.2 | 63.1 |
| NMC$_{fMLLR}$ | CNN | 74.1 | 77.0 | 74.9 | 67.5 | 63.7 |
| DAE-BN$_{fMLLR}$ | TCNN | 80.5 | 83.7 | 81.2 | 79.1 | 72.5 |

Table 4 shows that the CNN models gave lower WERs than the DNN models reported in Table 3. The convolution operation on the DAE-BN features did not reduce WERs as compared to the DNN model.

Bottleneck (BN) features were also investigated that were obtained by supervised training of a five-hidden-layer, fully connected DNN, which had a 60-dimensional BN at the third layer. The input to the BN-DNN had features spliced over 15 frames. It was observed that SBNs learned from the LAR data using a vowelized dictionary gave better performance than one using the standard non-vowelized dictionary; hence, the former was used to train the BN-DNN model. The DAE-BN system also had a similar configuration as the BN-DNN system: five hidden layers with a BN at the third layer. The BN features from the BN-DNN system performed slightly worse (0.4% relative) for the unseen channel conditions and a little better for the seen channel conditions, compared to the features from the DAE-BN system.

Experiment 5—Time-Frequency CNNs Trained with fMLLR-Transformed NMC and MFB Acoustic Features Next, time-frequency CNNs (TFCNNs) were investigated on fMLLR-transformed NMC and MFB features. TFCNNs have always shown better performance than their CNN counterparts, and here we also observed WER reduction compared to using CNN acoustic models. Table 5 shows the WERs from the TFCNN acoustic models. In addition we combined the fMLLR transformed MFB and NMC features and trained a fused CNN model (fCNN), where two parallel convolutional layers are trained for each of the two individual features.

TABLE 5

WERs from TFCNN models trained with $MFB_{fMLLR}$ and $NMC_{fMLLR}$ features and fCNN model trained with the $MFB_{fMLLR}$ + $NMC_{fMLLR}$ features for dev-1 channels A, B, C, E, and dev-1 all, for the no A-B train condition.

|  | dev-1 channels | | | | dev-1 |
| --- | --- | --- | --- | --- | --- |
|  | A | B | C | E | Avg. |
| $MFB_{fMLLR}$ | 72.4 | 76.0 | 73.9 | 66.7 | 62.8 |
| $NMC_{fMLLR}$ | 73.6 | 77.0 | 75.0 | 67.3 | 63.4 |
| $MFB_{fMLLR}$ + $NMC_{fMLLR}$ | 72.0 | 75.3 | 73.3 | 65.7 | 61.9 |

Experiment 6—DAE-BN-Adapted TFCNN Acoustic Models Trained with fMLLR-Transformed MFB, NMC, and MFB/NMC Fusion Acoustic Features Next, the BN features from the DAE-BN network were investigated and used these to generate a confidence measure. The entropy over a running window of 21 frames (i.e., ~230 ms of temporal information) of data was estimated for each dimension of the DAE-BN features and then computed the maximum entropy for each dimension. The cumulative entropy from the top 30% percentile maximum entropies across all the dimensions was used as a measure of confidence. Note that, as depicted in FIG. 8B, unseen data typically resulted in more spurious activations across the neurons, which resulted in higher entropy compared to seen data conditions. The entropy-based confidence measure was used to select the top 1K test segments for each channel condition that generated the lowest overall 30th percentile cumulative entropy for each channel condition and those test segments were used to adapt or retrain the acoustic model. Specifically, these test segments were used to retrain the previously trained TFCNN and fCNN models, using an L2 regularization of 0.02.

Table 6 presents the WERs obtained from the TFCNN and fCNN model adaptation for the $MFB_{fMLLR}$, $NMC_{fMLLR}$ and $MFB_{fMLLR}$+$NMC_{fMLLR}$ features. The same retraining procedure on the DAE-BN DNN system resulted in a relative WER reduction of 4.3%.

TABLE 6

WERs from adapted TFCNN models trained with $MFB_{fMLLR}$ and $NMC_{fMLLR}$ features and fCNN model trained with $MFB_{fMLLR}$ + $NMC_{fMLLR}$ feature for dev-1 channels A, B, C, E, and dev-1 all, for the no A-B train conditions.

|  | dev-1 channels | | | | dev-1 |
| --- | --- | --- | --- | --- | --- |
|  | A | B | C | E | Avg. |
| $MFB_{fMLLR}$ | 71.4 | 75.3 | 73.9 | 66.2 | 62.5 |
| $NMC_{fMLLR}$ | 73.0 | 76.1 | 74.2 | 67.2 | 63.1 |
| $MFB_{fMLLR}$ + $NMC_{fMLLR}$ | 70.4 | 74.4 | 72.6 | 65.4 | 61.3 |

As such, various improved systems and methods for speech recognition in unseen and noisy channel conditions are provided herein. It should be noted that any and all of the methods described herein for improving speech recognition in unseen and noisy channel conditions may be used in conjunction with one another. For example, any of the contemplated acoustic features discussed above can be extracted from the test segments taken from seen or unseen audio signals; subsequently, any, or none, of the feature space transformations discussed above can be performed on any of the extracted acoustic features; and the feature space transformed or non-transformed extracted acoustic features can be inputted into any of the neural networks contemplated herein. Furthermore, during use of any of the neural networks contemplated, the entropy-based confidence measures described herein can be used to select test segments with the lowest cumulative entropy to adapt the neural networks.

The present invention has been described in terms of one or more preferred embodiments, and it should be appreciated that many equivalents, alternatives, variations, and modifications, aside from those expressly stated, are possible and within the scope of the invention.

Additional Examples

Illustrative examples of the technologies disclosed herein are provided below. An embodiment of the technologies may include any one or more, and any combination of, the examples described below.

In an example 1, a method for speech recognition comprises receiving, using an input, an audio signal. The method further comprises splitting the audio signal into auditory test segments. The method further comprises extracting, from each of the auditory test segments, a set of acoustic features. The method further comprises applying the set of acoustic features to a deep neural network to produce a hypothesis for the corresponding auditory test segment. The method further comprises selectively performing one or more of: indirect adaptation of the deep neural network and direct adaptation of the deep neural network.

An example 2 includes the subject matter of example 1, wherein performing indirect adaptation of the deep neural network comprises extracting, from each of the auditory test segments, two distinct sets of acoustic features and applying the two distinct sets of acoustic features to the deep neural network simultaneously.

An example 3 includes the subject matter of any of examples 1 and 2, wherein the method further comprises performing a feature-space transformation on each of the two distinct sets of acoustic features prior to applying the two distinct sets of acoustic features to the deep neural network simultaneously.

An example 4 includes the subject matter of any of examples 1, 2, and 3, wherein the feature-space transformation is a feature space maximum likelihood linear regression transformation.

An example 5 includes the subject matter of any of examples 1, 2, 3, and 4, wherein the set of acoustic features comprises a set of feature vectors, each of the set of feature vectors comprising quantitative measures of acoustic properties of the corresponding auditory test segment.

An example 6 includes the subject matter of any of examples 1, 2, 3, 4, and 5, wherein the quantitative measures of acoustic properties comprise at least one of gammatone filterbank energies, normalized modulation coefficients, mel-filterbank energies, and mel-frequency cepstral coefficients.

An example 7 includes the subject matter of any of examples 1, 2, 3, 4, 5, and 6, wherein the deep neural network is pre-trained using transcribed audio signals.

An example 8 includes the subject matter of any of examples 1, 2, 3, 4, 5, 6, and 7, wherein the method further comprises applying the set of acoustic features to a deep autoencoder to produce (i) a set of deep autoencoder bottleneck features, and (ii) a set of recovered acoustic features based on an inverse operation by the deep autoencoder on the set of deep autoencoder bottleneck features.

An example 9 includes the subject matter of any of examples 1, 2, 3, 4, 5, 6, 7, and 8, wherein the set of deep autoencoder bottleneck features is used to extract an entropy-based confidence measure for the corresponding auditory test segment.

An example 10 includes the subject matter of any of examples 1, 2, 3, 4, 5, 6, 7, 8, and 9, wherein performing direct adaptation of the deep neural network comprises selecting, using the entropy-based confidence measure, the auditory test segments having percentile cumulative entropies below a threshold percentile cumulative entropy and retraining the deep neural network using the selected auditory test segments.

An example 11 includes the subject matter of any of examples 1, 2, 3, 4, 5, 6, 7, 8, 9, and 10, wherein the deep autoencoder is pre-trained with transcribed audio signals using mean squared error backpropagation.

An example 12 includes the subject matter of any of examples 1, 2, 3, 4, 5, 6, 7, 8, 9, 10, and 11, wherein the deep neural network is one of a convolutional neural network, a time-convolutional neural network, and a time-frequency convolutional neural network.

In an example 13, a speech recognition system comprises an input configured to receive an audio signal. The speech recognition system further comprises a processor and a memory having instructions executable by the processor, causing the processor to receive, using the input, the audio signal; split the audio signal into auditory test segments; extract, from each of the auditory test segments, a set of acoustic features; apply the set of acoustic features to a deep neural network to produce a hypothesis for the corresponding auditory test segment; and selectively perform one or more of: indirect adaptation of the deep neural network and direct adaptation of the deep neural network. The speech recognition further comprises an output configured to transmit the hypothesis.

An example 14 includes the subject matter of example 13, wherein the deep neural network is pre-trained using transcribed audio signals.

An example 15 includes the subject matter of any of examples 13 and 14, wherein, when performing indirect adaptation of the deep neural network, the processor is configured to extract, from each of the auditory test segments, two distinct sets of acoustic features and apply the two distinct sets of acoustic features to the deep neural network simultaneously.

An example 16 includes the subject matter of any of examples 13, 14, and 15, wherein the processor is further configured to perform a feature-space transformation on each of the two distinct sets of acoustic features prior to applying the two distinct sets of acoustic features to the deep neural network simultaneously.

An example 17 includes the subject matter of any of examples 13, 14, 15, and 16, wherein the feature-space transformation is a feature space maximum likelihood linear regression transformation.

An example 18 includes the subject matter of any of examples 13, 14, 15, 16, and 17, wherein the processor is further configured to apply the set of acoustic features to a deep autoencoder to produce (i) a set of deep autoencoder bottleneck features, and (ii) a set of recovered acoustic features based on an inverse operation by the deep autoencoder on the set of deep autoencoder bottleneck features.

An example 19 includes the subject matter of any of examples 13, 14, 15, 16, 17, and 18, wherein the set of deep autoencoder bottleneck features is used by the processor to extract an entropy-based confidence measure for the corresponding auditory test segment.

An example 20 includes the subject matter of any of examples 13, 14, 15, 16, 17, 18, and 19, wherein performing direct adaptation of the deep neural network comprises selecting, using the entropy-based confidence measure, the auditory test segments with percentile cumulative entropies below a threshold percentile cumulative entropy and retraining the deep neural network using the selected auditory test segments.

The invention claimed is:

1. A method for speech recognition comprising:
   receiving, using an input, an audio signal;
   splitting the audio signal into auditory test segments;
   extracting, from each of the auditory test segments, a set of acoustic features;
   applying the set of acoustic features to a deep neural network to produce a hypothesis for the corresponding auditory test segment; and
   selectively performing one or more of: indirect adaptation of the deep neural network and direct adaptation of the deep neural network.

2. The method of claim 1, wherein performing indirect adaptation of the deep neural network comprises:
   extracting, from each of the auditory test segments, two distinct sets of acoustic features; and
   applying the two distinct sets of acoustic features to the deep neural network simultaneously.

3. The method of claim 2, further comprising:
   performing a feature-space transformation on each of the two distinct sets of acoustic features prior to applying the two distinct sets of acoustic features to the deep neural network simultaneously.

4. The method of claim 3, wherein the feature-space transformation is a feature space maximum likelihood linear regression transformation.

5. The method of claim 1, wherein the set of acoustic features comprises a set of feature vectors, each of the set of feature vectors comprising quantitative measures of acoustic properties of the corresponding auditory test segment.

6. The method of claim 5, wherein the quantitative measures of acoustic properties comprise at least one of gammatone filterbank energies, normalized modulation coefficients, mel-filterbank energies, and mel-frequency cepstral coefficients.

7. The method of claim 1, wherein the deep neural network is pre-trained using transcribed audio signals.

8. The method of claim 7, further comprising:
   applying the set of acoustic features to a deep autoencoder to produce (i) a set of deep autoencoder bottleneck features, and (ii) a set of recovered acoustic features based on an inverse operation by the deep autoencoder on the set of deep autoencoder bottleneck features.

9. The method of claim 8, wherein the set of deep autoencoder bottleneck features is used to extract an entropy-based confidence measure for the corresponding auditory test segment.

10. The method of claim 9, wherein performing direct adaptation of the deep neural network comprises:
selecting, using the entropy-based confidence measure, the auditory test segments having percentile cumulative entropies below a threshold percentile cumulative entropy; and
retraining the deep neural network using the selected auditory test segments.

11. The method of claim 8, wherein the deep autoencoder is pre-trained with transcribed audio signals using mean squared error backpropagation.

12. The method of claim 1, wherein the deep neural network is one of a convolutional neural network, a time-convolutional neural network, and a time-frequency convolutional neural network.

13. A speech recognition system comprising:
an input configured to receive an audio signal;
a processor and a memory having instructions executable by the processor, causing the processor to:
receive, using the input, the audio signal;
split the audio signal into auditory test segments;
extract, from each of the auditory test segments, a set of acoustic features;
apply the set of acoustic features to a deep neural network to produce a hypothesis for the corresponding auditory test segment;
selectively perform one or more of: indirect adaptation of the deep neural network and direct adaptation of the deep neural network; and
an output configured to transmit the hypothesis.

14. The speech recognition system of claim 13, wherein the deep neural network is pre-trained using transcribed audio signals.

15. The speech recognition system of claim 14, wherein, when performing indirect adaptation of the deep neural network, the processor is configured to:

extract, from each of the auditory test segments, two distinct sets of acoustic features; and
apply the two distinct sets of acoustic features to the deep neural network simultaneously.

16. The speech recognition system of claim 15, wherein the processor is further configured to:
perform a feature-space transformation on each of the two distinct sets of acoustic features prior to applying the two distinct sets of acoustic features to the deep neural network simultaneously.

17. The speech recognition system of claim 16, wherein the feature-space transformation is a feature space maximum likelihood linear regression transformation.

18. The speech recognition system of claim 14, wherein the processor is further configured to:
apply the set of acoustic features to a deep autoencoder to produce (i) a set of deep autoencoder bottleneck features, and (ii) a set of recovered acoustic features based on an inverse operation by the deep autoencoder on the set of deep autoencoder bottleneck features.

19. The speech recognition system of claim 18, wherein the set of deep autoencoder bottleneck features is used by the processor to extract an entropy-based confidence measure for the corresponding auditory test segment.

20. The speech recognition system of claim 19, wherein performing direct adaptation of the deep neural network comprises:
selecting, using the entropy-based confidence measure, the auditory test segments with percentile cumulative entropies below a threshold percentile cumulative entropy; and
retraining the deep neural network using the selected auditory test segments.

* * * * *